United States Patent [19]
Haynes

[11] Patent Number: 5,626,299
[45] Date of Patent: May 6, 1997

[54] CONDIMENT MILL WITH CONVEYING SPACE

[76] Inventor: Brian T. Haynes, 119 W. Schubert Ave., Glendale Heights, Ill. 60139

[21] Appl. No.: 456,807

[22] Filed: Jun. 1, 1995

[51] Int. Cl.$^6$ .................................................. A47J 42/40
[52] U.S. Cl. ........................................................ 241/169.1
[58] Field of Search .............................. 241/168, 169.1; 222/142.1–142.9

[56] References Cited

U.S. PATENT DOCUMENTS

| | | | |
|---|---|---|---|
| 1,251,160 | 12/1917 | Woody | 241/169.1 X |
| 3,136,491 | 6/1964 | Posmanter | 241/169.1 |
| 4,026,490 | 5/1977 | Johansson | 241/169.1 |
| 4,231,527 | 11/1980 | Bounds | 241/169.1 |
| 4,530,470 | 7/1985 | Beilstein | 241/169.1 |
| 4,632,322 | 12/1986 | Beilstein | 241/169.1 |
| 4,771,955 | 9/1988 | Paulson | 241/169.1 |
| 4,865,258 | 9/1989 | Simth et al. | 241/169.1 |
| 5,145,119 | 9/1992 | Lowe . | |

*Primary Examiner*—Mark Rosenbaum

[57] ABSTRACT

The preferred embodiment is an improved condiment mill that utilizes a conveying space around and below the grinding mill reservoir to catch the condiment as it is ground. The first hollow body member forms the condiment reservoir and contains the grinding area. The second hollow body member forms an annular conveying space around the outside of the first hollow body member. This second hollow body member is divided into a top piece and bottom piece. The top piece of the mill covers the inner condiment reservoir and forms part of the annular conveying space. In this embodiment the top is rotatable and transmits rotational energy to the grinding area. Where the top of the mill covers the conveying space two types of discharge mechanisms are provided.

The first mechanism is a plurality of holes for sprinkling condiment while the other is a pour spout for measured discharge of condiment. Both mechanisms can be used on the top of the mill above the conveying space. Condiment grinding is achieved in this embodiment by rotating the top of the mill relative to the bottom although a crank handle could be attached to the mill top. Ground condiment falls from the reservoir into the conveying space below and is discharged by tipping the mill.

If an existing mill is to be retrofit with this design the mill would slip into an outer slip-on casing that would form an annular conveying space around the mill. Stops inside the bottom of the slip-on casing would prevent the mill from sliding all the way to the bottom and sealing off the ground condiment discharge path. Similar to the integral designs the top of the mill above the conveying space would be penetrated by a pour spout and/or holes for delivering the product. The slip-on casing in the retrofit device would be held to the mill by friction or other fastening means.

The conveying space need only be designed so that it catches condiment either ground or dislodged out of the base and, by tilting the mill, channels this condiment to a discharge point. This prevents unwanted discharge of ground condiment and allows the user control over the amount of product discharged.

7 Claims, 6 Drawing Sheets

CONDIMENT MILL WITH CONVEYING SPACE

BACKGROUND OF THE INVENTION

1. Field of the Invention

This invention relates to food and condiment grinding mills such as pepper mills and more particularly to a unique method of dispensing the ground food or condiment.

2. Prior Art

Pepper mills are typical of this type of food mill and for the remainder of this description the invention will be so referenced.

Conventional pepper mills have the undesirable side effect of discharging ground pepper whenever they are returned to the table between uses. After grinding pepper corns over the food an amount of ground pepper remains attached to the grinding surfaces. When the mill is placed on a table or shelf the clinging ground pepper becomes dislodged. In the prior art attempts were made to prevent this undesirable discharge by sealing the base of the mill when not in use. U.S. Pat. No. 4,771,955 to Paulson on Sep. 20, 1988 describes two mechanical methods of preventing unwanted discharge from pepper mills. The first method utilizes a bottom plug type seal that is either opened before use of the mill or is pushed and held down while using the mill. One problem is that pepper will cling to the plug of this design in exactly the same manner as to the grinding surfaces. When the plug is released the clinging pepper will clog the seal surface reducing operational effectiveness. Any ground pepper clinging to the plug will eventually fall off on the table. In the second method slide gates just below the discharge point of the mill are opened during grinding. These gates can be attached to existing mills or made integral with new designs. Whenever gates are used the problem of discharge control arises. When the slide gates are opened or the seal pushed down the pepper caught there is discharged whether that is the correct amount or not. With the slid gate design pepper will accumulate on the inner surface of the gate, then the pepper will eventually fall out in clumps.

U.S. Pat. No. 4,231,527 to Bounds Nov. 4, 1980 utilizes a concave dish located below the grinding mechanism of the mill to catch ground pepper that may cling to the grinding mechanism after use of the mill. The most obvious problem with this design is that some of the ground pepper will always be caught by the dish. When the user tilts the mill during operation, any pepper that had accumulated from the last use will fall, which means even handling the mill will cause discharge, and regardless of the angle of tilt during use, pepper will accumulate on the dish making accurate control over the amount of condiment dispensed impossible. Further, any pepper at the edge of the dish will fall out when the mill is returned to the upright position and placed on the table after use, defeating the original concept.

U.S. Pat. No. 3,136,491 to Posmanter Jun. 9, 1964 utilizes either a perforated or non-perforated cap to cover the mill, making it look more presentable for table use. The perforated design does nothing to control the amount of discharge of pepper since any change in flow would mean buildup in the cap. Further, the non-perforated design requires that the user remove the cap before operating the mill, otherwise the cap fills with pepper and when removed falls uncontrollably about the table.

Unknown in the prior art is the ability to easily control the amount of ground pepper discharged from the mill. Most recipes that call for pepper use volume measurements. Due to the need of two hands to operate typical crank type mills the user could not hold a measurement device and grind pepper at the same time. What is needed is a means to easily pour fresh ground pepper into any measuring device.

Often there is the desire for a dash of fresh ground pepper in just the right place. Normally any turn of the grinding mechanism of a typical mill will discharge an amount of fresh pepper proportional to the diameter of the mill grinding mechanism and the coarseness of the grind. The act of turning the crank or twisting the mill always causes the pepper to go everywhere but where it is needed. What is required is a way to shake out a small amount of fresh ground pepper right where it is needed.

OBJECTS AND ADVANTAGES

Based on a unique method of discharging ground pepper from this mill it is an object of the invention to allow for more precise control over the placement of ground pepper.

A second objective is to provide a means for precise measurement of the fresh ground pepper.

A third object of the invention is to catch any pepper that is discharged from the mill grinding area between uses and during storage of the mill.

A fourth object of the invention is a mill that is easy to construct at a low cost with a minimum of moving parts.

A fifth object of this invention is to catch unwanted discharge as an integral part of the mill design.

A sixth object of this invention is to provide a removable conveying space employing all the advantages described that can be attached to existing mills.

And finally it is an object of this invention to provide an improved pepper mill.

These and other objects along with advantages of the invention will become apparent during the following detailed description of preferred embodiments of the invention.

SUMMARY OF INVENTION

A condiment or pepper mill utilizing a conveying space below and around the sides of the pepper reservoir that will catch ground pepper and allow the user to channel the ground pepper to a discharge point. The hollow body reservoir of the mill defines the pepper storage well and houses the grinding mechanism. A hollow cup shaped base mounted below the reservoir forms the annular conveying space around the lower section of the reservoir. An inverted cup shaped top encloses the upper section of the reservoir and completes the annular conveying space. In the described embodiment the top is rotatable and acts as the grinding handle. This top also separates the conveying space from the storage reservoir and where the top of the mill covers the conveying space two types of discharge mechanisms are provided. The first mechanism is a plurality of holes for sprinkling pepper while the other is a pour spout for measured discharge of pepper. For a more typical mill a crank handle can be attached to the mill top. This handle crank design can utilizes a threaded reservoir and base to make the two easy to separate. In either design ground pepper falls from the reservoir into the conveying space below and is discharged by tipping the mill, directing the ground pepper to either the pour spout or sprinkle holes. If an existing mill is to be retrofit the mill slips into an outer slip-on casing that forms the annular conveying space around and below the mill. Stops inside the bottom of the slip-on casing prevent the mill from sliding all the way to the bottom and sealing off the ground pepper discharge path. Similar to the integral designs, the top of the mill above the conveying space would be penetrated by a pour spout and/or holes for delivering the product. The slip-on casing in the retrofit device would be held to the mill by friction or other fastening means. The conveying space need only be designed so that it catches pepper either ground or dislodged out of the base and, by tilting the mill, channels this pepper to a designed discharge point.

DESCRIPTION OF THE DRAWINGS

The drawings described below illustrate preferred embodiments of the invention and are not intended to be taken as the only embodiment.

SPECIFIC DESCRIPTION

Figure 1:
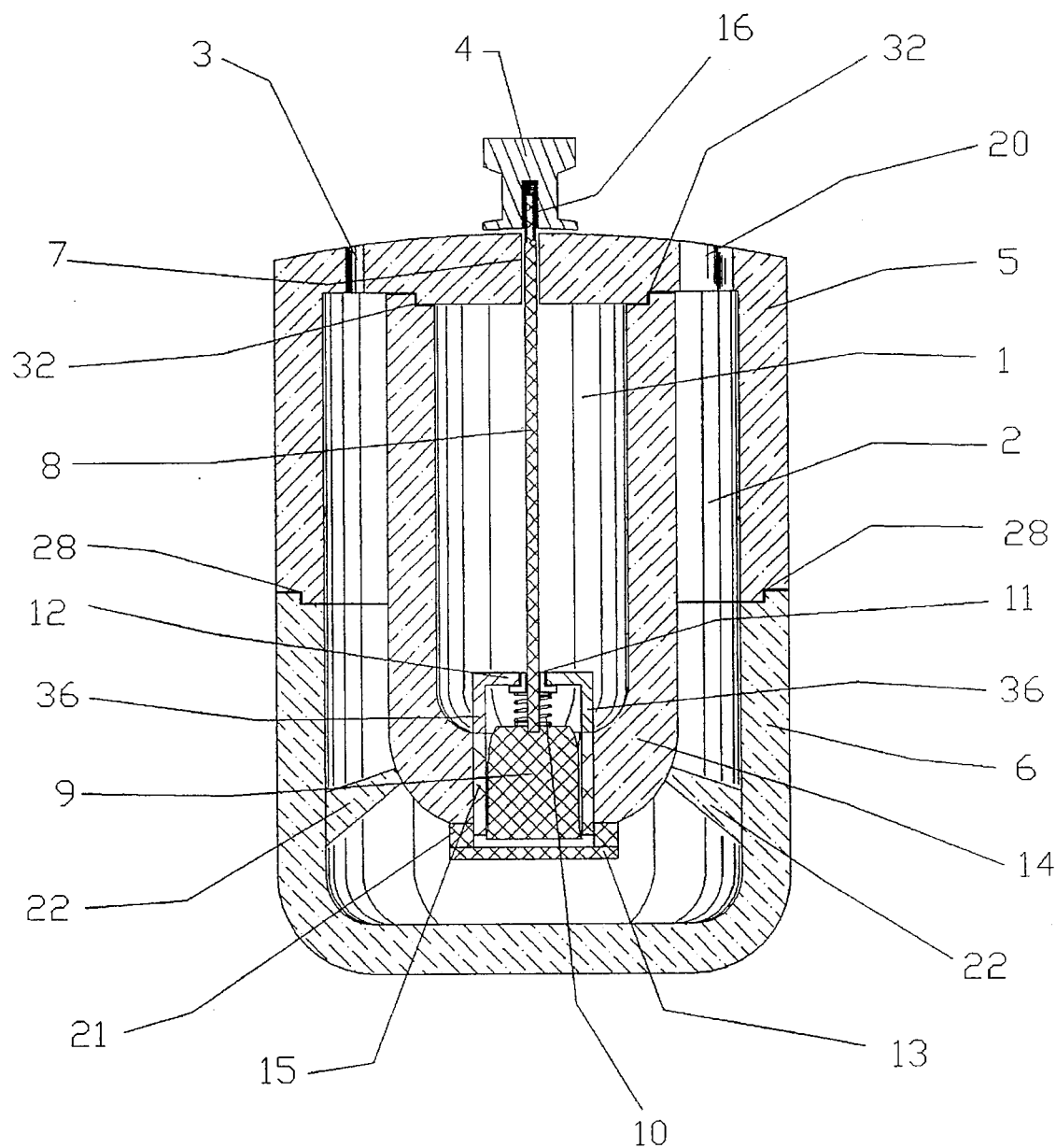
FIG. 1 shows a longitudinal section view of the preferred embodiment of the invention.

Referring to FIG. 1 the cross sectional view of the preferred embodiment, the pepper mill includes a hollow body reservoir 14 wherein peppercorns are stored in a storage well or reservoir 1. Surrounding reservoir 14 is a conveying space or annulus 2 formed by the enclosure of reservoir 14 by a base 6 and a top 5 that makeup the outer surface of this embodiment. Top 5 is penetrated by a plurality of shaker holes 3, a pour spout 20 and a shaft hole 7. Reservoir 14 is mounted to base 6 by a plurality of support legs or posts 22.

Base 6 mates with top 5 at interlocking rings or lips 28. Similar interlocking rings or lips 32 are used at the mating surface of top 5 and reservoir 14.

Shaft hole 7 is a square hole that excepts a grinding shaft 8 that extends through the center line of the mill. The upper end of shaft 8 has a threaded portion 16 and is square in the area of shaft hole 7. Mating threads for threaded portion 16 are located in an adjusting or retaining nut 4.

Shaft 8 is fixed at the lower end to a grinding rotor or hammer 9. Resiliently urging grinding rotor 9 and shaft 8 in a downward direction is a tensioning spring 10. On top of tensioning spring 10 is a shaft bearing or sleeve 11. Shaft bearing 11 has a circular surface and is formed with a central square hole. Shaft 8 fits through a hole in shaft bearing 11. These four pieces are held in place on the top by a shaft retaining clamp 12. Shaft retaining clamp 12 has a central circular ring with a plurality of "L" shaped strap or support legs 36. In the center of retaining clamp 12 is a circular hole through which bearing 11 fits.

Holding the combined shaft 8 and grinding rotor 9 in place on the bottom is a support bar or retaining strap 13. Support bar 13 has a spacer portion 21 that is fixedly attached to reservoir 14.

Encircling the grinding rotor 9 is a grinding stator, anvil or ring 15. Grinding stator 15 is fixedly attached to a circular hole in the base of reservoir 14. Retaining strap 12 is in turn fixedly attached to grinding stator 15 through strap legs 36.

Figure 2:
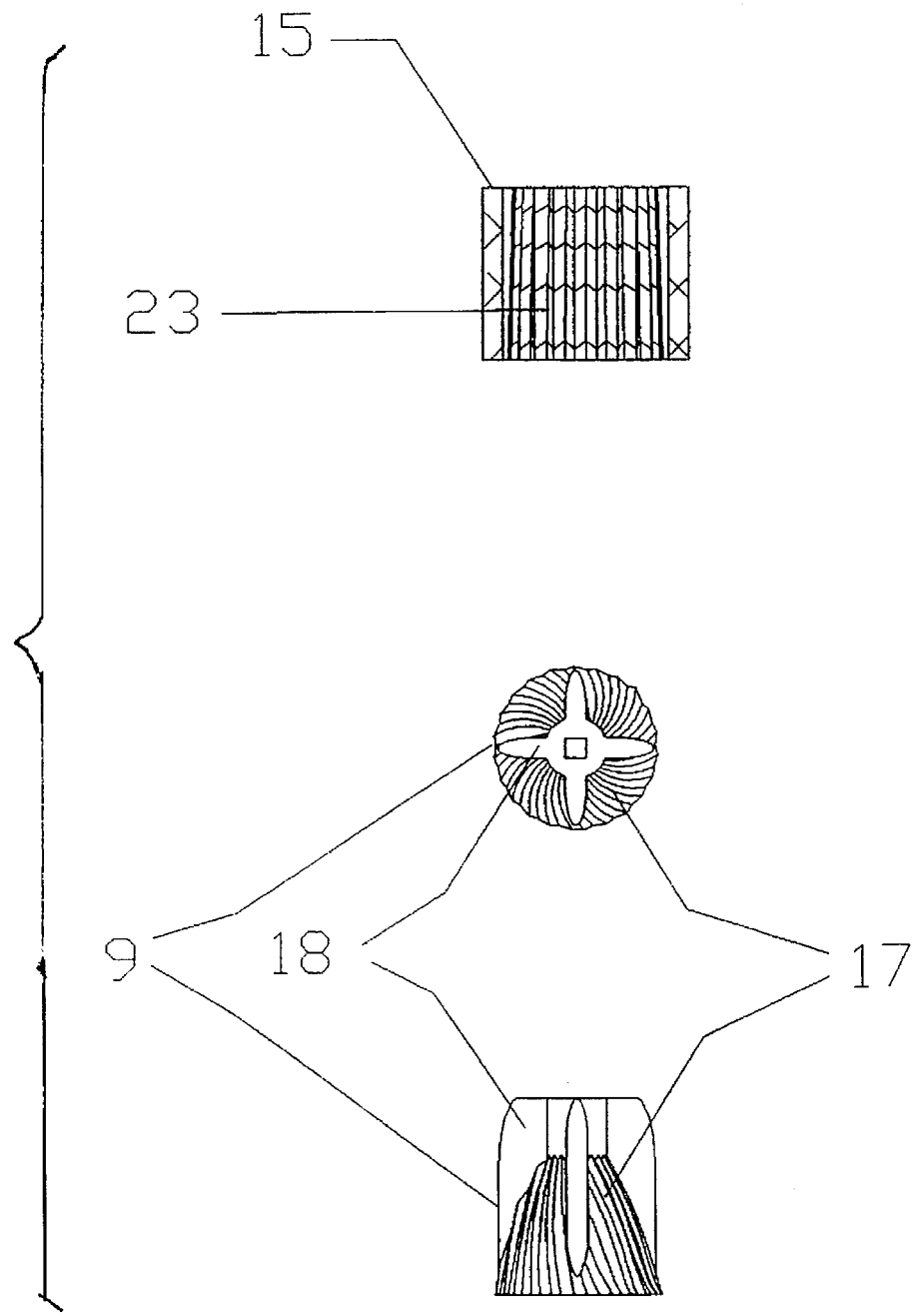
FIG. 2 shows details of the grinding rotor and grinding stator.

FIG. 2 is a detail of grinding stator 15 and rotor 9. The parabolic surface of rotor 9 is covered in a plurality of semicircular grooves that make up the fine grinding surface 17. Protruding above the grinding surface 17 are a plurality of feeding flaps or diverters 18. Mated to the fine grinding surface 17 of rotor 9 are the grinding ridges 23 on the inside of stator 15.

Figure 3:
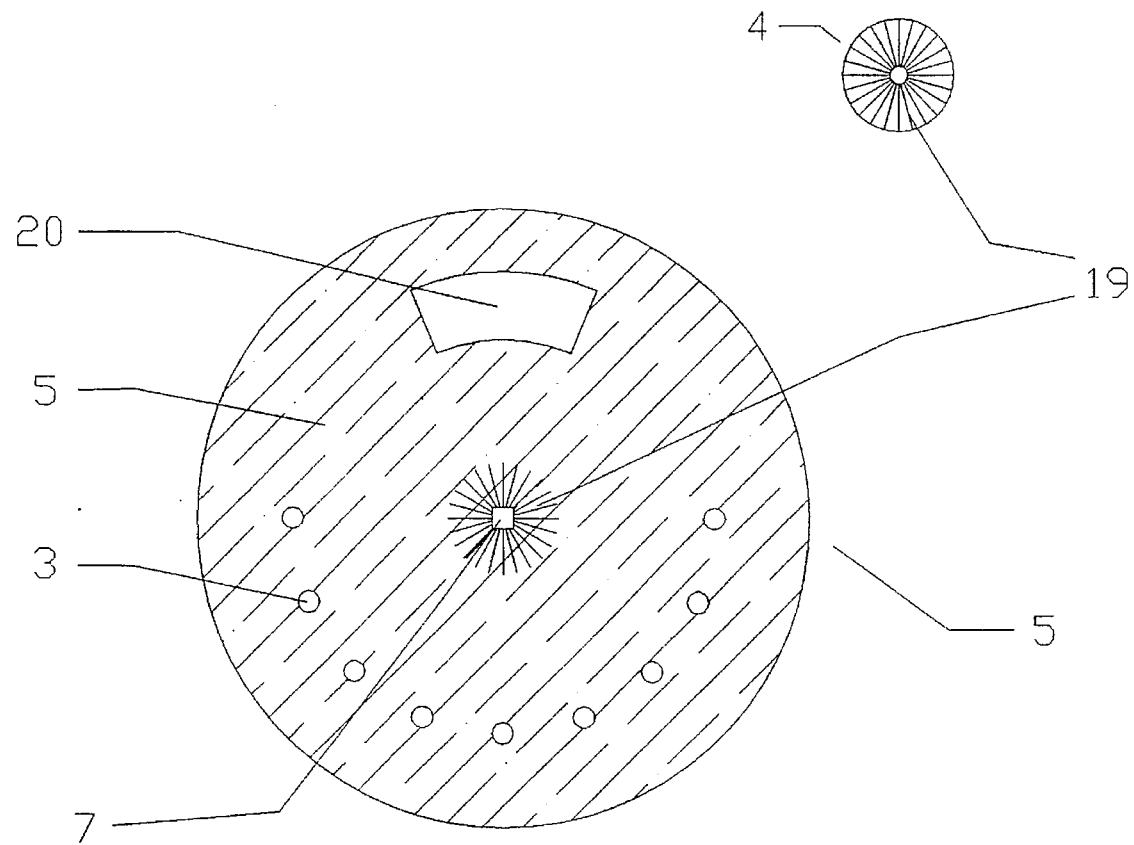
FIG. 3 shows details of antislip grooves cut into or formed on the surface of both the adjusting nut and top of the mill.

FIG. 3 is a top view of mill top 5 and bottom view of adjusting nut 4 to detail the location of radial grooves or ridges 19. Also shown are the preferred locations of shaker holes 3 and pour spout 20.

Figure 4:
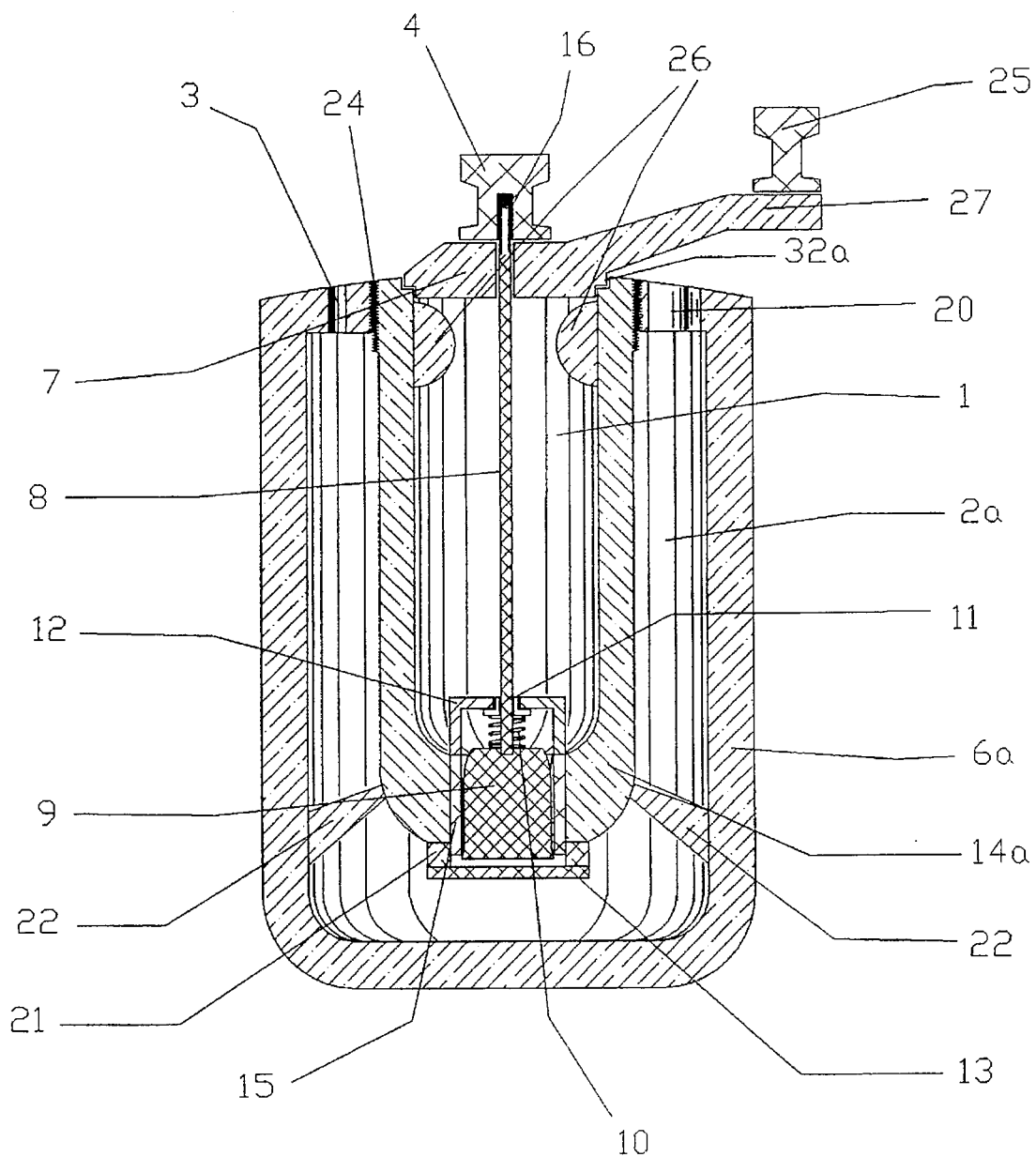
FIG. 4 shows the embodiment of the invention with a crank handle in longitudinal cross section.

FIG. 4 embodies the same basic design of the previously described mill shown in FIG. 1 but includes a more standard pepper mill crank handle. One obvious difference in this embodiment is the addition of separation or division threads 24 on the mating surface between a base 6a and a reservoir 14a. This allows for complete removal of the reservoir 14a and associated internals.

As before, adjusting nut 4 has an internal threaded section mated to receive upper threaded portion 16 of shaft 8. Held down by adjusting nut 4 is a crank or handle top 27 fitted with one or more handles for turning. At the end of each handle on crank top 27 is a crank or finger knob 25, only one handle is shown in the figure. Crank top 27 uses interlocking rings or lips 32a at the mating surface between crank top 27 and reservoir 14a. This mating surface is circular. A square hole 7 though crank top 27 is provided to admit shaft 8 which is square in the area of crank top 27.

Another difference in this embodiment is the addition of a plurality of twist tabs 26 to the inside surface of reservoir 14a. These twist tabs 26 are fixedly attached to or formed as part of reservoir 14a. They allow for ease of removal or installation of the reservoir for fabrication, maintenance, and cleaning purposes. Using a minimum structural strength for twist tabs 26 prevents reduction of passable void space in storage well 1.

A conveying space or annulus 2a in this embodiment is formed by base 6a around reservoir 14a. To completely enclose the conveying space 2a in this embodiment, base 6a has a short inwardly projecting ledge through which shaker holes 3 and/or pour spout 20 penetrate.

Fixedly attached to the inner surface of base 6a are a plurality of reservoir support legs 22. These support legs are not attached to the surface of reservoir 14a but utilize a friction fit. In this embodiment support legs 22 act as structural stiffeners and stops when tightening reservoir 14a into base 6a.

Figure 5:
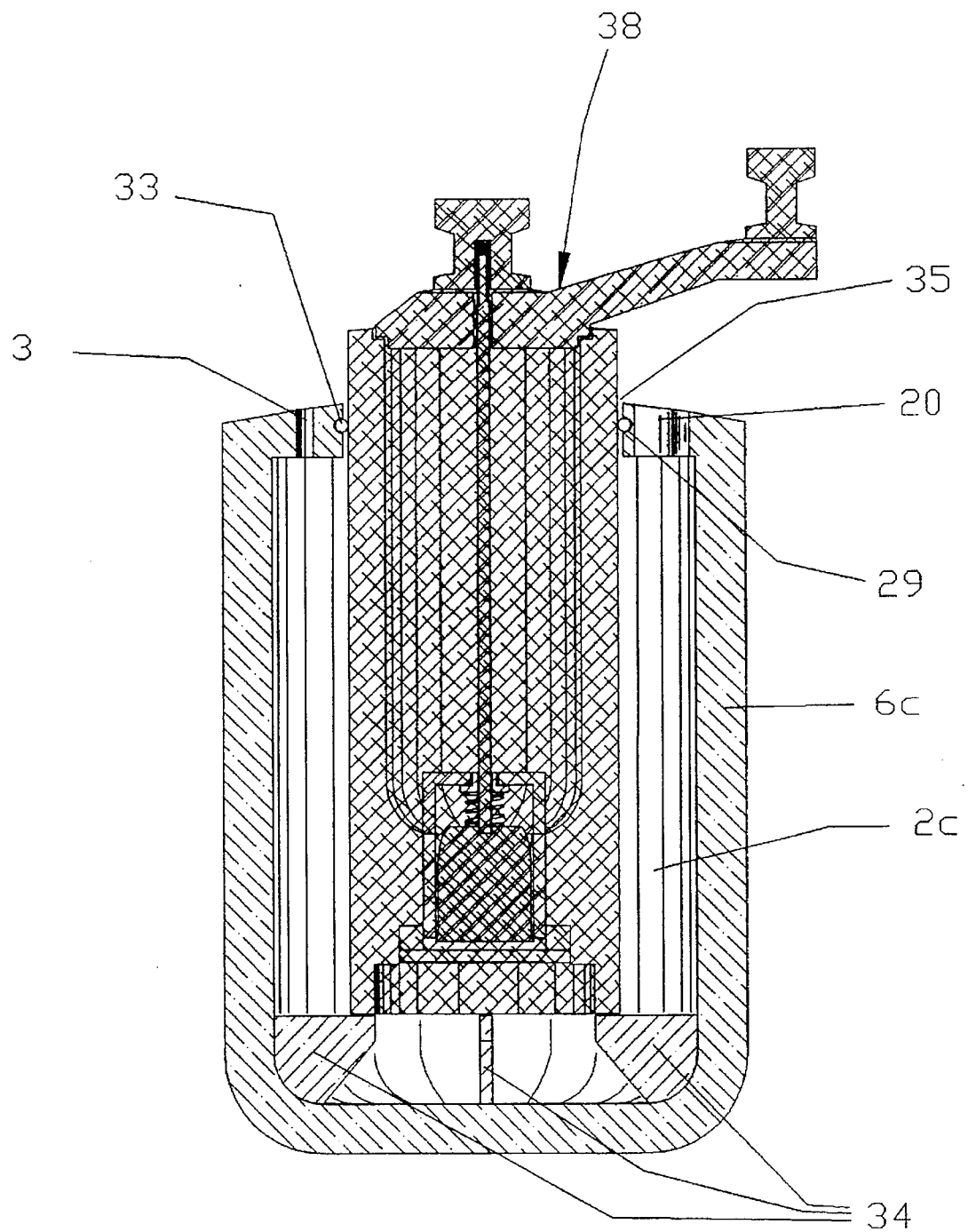
FIG. 5 shows the embodiment of the invention as a slip-on unit designed to be removable attach to existing mills.

One embodiment of the pepper discharge system can be designed to releasably fit on an existing conventional pepper mill and is show in FIG. 5. A base 6c forms a conveying space 2c around the outside of conventional mill 38. Mill 38 fits through a mill opening 35 cut or formed in top of base 6c to match the surface structure of mill 38. A circumferential retainer or O-ring 33 is located in opening 35 and held in place by a semicircular groove 29.

At the bottom of base 6c are a plurality of mill stops 34. These stops are fixedly attached to base 6c and not attached to mill 38. On the inwardly projecting top ledge of base 6c are located pour spout 20 and/or shaker holes 3.

Figure 6:
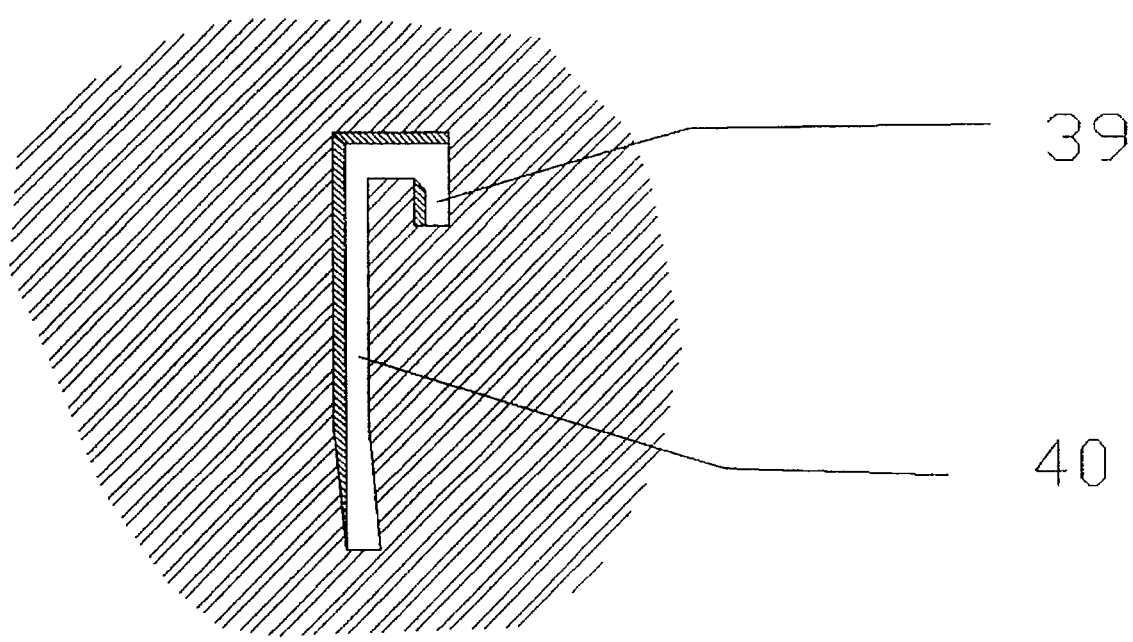
FIG. 6 shows details of an interlocking groove design to allows for separation of the pepper corn reservoir from the base in the preferred embodiment.

FIG. 6 shows a detail of a locking groove 40 that is an optional replacement for fixedly attaching supports 22 to reservoir 14 in the embodiment shown in FIG. 1. A locking section 39 located at the hooked section of the locking groove 40 is where the ends of supports 22 rest after the mill is reassembled.

OPERATION OF INVENTION

Again referring to FIG. 1 the cross sectional view of the preferred embodiment of the mill, the pepper corns are stored in pepper corn storage well 1. Pepper ground in the base of reservoir 14 will discharge into the lower portion of conveying space 2. Ground pepper can be removed from the mill through shaker holes 3 or through pour spout 20. Although it is not necessary for operation of the mill, pour spout 20 can be fitted with a slide door or pull out chute. Pepper corns are added to storage well 1 by detaching adjusting nut 4. In this embodiment adjusting nut 4 is threaded onto a threaded portion 16 of shaft 8. Once adjusting nut 4 has been removed from shaft 8, top 5 can be lifted off of base 6 and pepper corns poured directly into storage well 1.

Grinding of pepper corns is achieved in this embodiment by twisting the rotatable top 5 in relation to base 6. Mating faces of top 5 and base 6 are circular and provided with interlocking rings 28 to prevent slippage of the two surfaces during rotation of top 5. Interlocking rings 32 are also provided for the mating surfaces of top 5 and reservoir 14. Another advantage of this interlocking ring mechanism used for these two mating surfaces is that they act as a seal to prevent loss of pepper across the mating surfaces. If the material of construction of the mill is such that friction is a problem at these mating surfaces, gaskets of PTFE or other low friction materials can be applied to or place between the surfaces. In this embodiment reservoir 14 and base 6 are fixedly attached through a plurality of reservoir supports 22. These supports 22 are designed to allow for a high percentage of free area in the conveying space with a minimum surface area exposed to ground pepper during use. For a more versatile design reservoir 14 and supports 22 can be connected using a locking groove 40 cut into reservoir 14.

The preferred design of this type of groove is shown in FIG. 6. The groove 40 is shaped like an upside down "j" so that when reservoir 14 is slid into base 6 and twisted, the ends of supports 22 rests above lock section 39. During assembly, hold reservoir 14 and base 6 in position, install top 5 and reattach adjusting nut 4. As adjusting nut 4 is tightened, reservoir 14 will be drawn upward until the end of support 22 engages lock section 39. This locking means allows for the removal of reservoir 14 for cleaning of conveying space 2 or repair of the mill.

A shaft hole 7 in top 5 through which shaft 8 extends is a square hole in the preferred embodiment. The shape of shaft 8 in the area where the shaft penetrates top 5 is also square. This square design allows for movement of shaft 8 when top 5 is rotated relative to base 6. The upper end of shaft 8 has a threaded portion 16. When top 5 is held in position adjusting nut 4 can be tightened/loosened on shaft 8 at threaded portion 16 thereby raising/lowering the grinding rotor 9. Threaded portion 16 extends below top 5 a distance not less than the distance required to move the grinding means form rest position to finest grind position.

As indicated the degree of grind of the pepper corns, from a finely ground product through infinite variations to a coarse grind, can be achieved by tightening adjusting nut 4 on threaded portion 16 while top 5 is held stationary. This has the result of changing the spacial relationship of grinding rotor 9 to grinding stator 15. Shaft 8 is fixedly attached to grinding rotor 9 or these two can be formed from one piece of material. The preferred material of construction is metal. Grinding rotor 9 is resiliently biased in the desired spacial position by the force of a tensioning spring 10. The combined shaft 8 and grinder rotor 9 are held between a shaft retaining clamp 12 above and support strap 13 at the base of reservoir 14, in this embodiment.

Above grinding rotor 9, retaining clamp 12 is fixedly attached to reservoir 14, grinding stator 15, or can be formed as one piece with stator 15. Inserted into retaining clamp 12 from below is shaft bearing 11. Shaft bearing 11 is externally circular and fits into a circular hole in retaining strap 12. Shaft 8 fits into a square hole through the center of shaft bearing 11, if shaft 8 is square in this area. If shaft 8 is circular in the area of shaft bearing 11 the hole should be circular. Tensioning spring 10 is coaxial to shaft 8 and abuts on top shaft bearing 11. On the bottom tensioning spring 10 abuts grinding rotor 9. In addition to positioning rotor 9, tensioning spring 10 also serves the purpose of holding top 5 onto base 6. Tensioning spring 10 is normally under compression. Shaft bearing 11 is typically metal due to wear caused by friction during use of the mill. This preferred design prevents rubbing of spring 10 against retaining clamp 12 when shaft 8 is rotated during use of the pepper mill.

Below, grinding rotor 9 is held in place by support strap 13 that is fixedly or removably attached to the base of reservoir 14. The type of connections made between support strap 13 and reservoir 14 will depend on their material of construction but could be a chemical or thermal bond if plastics are used. Pins or screws would be better if the materials of construction of grinding reservoir 14 is wood or metal. The thickness of spacer portion 21 of the retaining strap 13 determines the maximum size of the ground pepper. In normal use of the mill grinding rotor 9 does not rest on retaining strap 13. However, when adjusting nut 4 is removed during refilling of storage well 1, support strap 13 holds the attached shaft 8, grinding rotor 9, spring 10, and shaft bearing 11 in place in the mill. When top 5 is replaced and adjusting nut 4 is reattached and tightened the grinding rotor 9 lifts off of retaining strap 13 to the desired grinding position.

Grinding is achieved by rotation of top 5 which rotates shaft 8 which in turn rotates grinding rotor 9 in relation to grinding stator 15. Grinding stator 15 is fixedly attached to reservoir 14. Referring to FIG. 2, grinding rotor 9 includes a plurality of particle feeding or channeling flaps 18 that channel the pepper corn onto a semicircular grooved parabolic fine grinding surface 17. The grooves on top of fine grinding surface 17 along with feeding flaps 18 begin the grinding process by splinting the pepper corns against grinding ridges 23 of grinding stator 15. This action facilitates the subsequent grinding of the pepper corns into a finer size as they fall further down between the side of fine grinding surface 17 and stator 15. This grinding action implies that both stator 15 and rotor 9 should be fabricated from a durable material such as metal. As can be seen from FIG. 1, as grinding rotor 9 is moved down and away from stator 15 by rotation of adjusting nut 4, the size of the final pepper effluent from the mill will increase.

To prevent slippage of adjusting nut 4 during use, this embodiment utilizes grooves 19 cut radially into the bottom of adjusting nut 4, see FIG. 3. Mating grooves are located on top 5 where adjusting nut 4 contacts this surface.

FIG. 4 illustrates a crank handle design of the invention which allows for some added benefits while retaining many of the same design features described previously. Pepper corns are stored in storage well 1 and ground pepper will fall into conveying space 2a. Ground product is removed from the mill through shaker holes 3 and/or through pour spout 20 that penetrate base 6a above conveying space 2a. Pepper corns are added to storage well 1 by unscrewing adjusting nut 4, removing crank top 27 and then pouring pepper corns directly into storage well 1.

Grinding of pepper corns is achieved in this embodiment by rotating crank knob 25 in relation to a base 6a. This causes the rotation of crank top 27 which transmits this energy through shaft 8 to grinding rotor 9. Mating faces of crank top 27 and reservoir 14 are provided with interlocking rings 32a to prevent slippage of the two surfaces and to seal storage well 1.

In this embodiment reservoir 14 is not attached to supports 22 so that reservoir 14 can be detached from the base 6a. Reservoir 14 is fitted into base 6a via separation threads 24. Separation of the two sections is eased by the addition of twist tabs 26 that allow the use of the forefinger and thumb to twist out reservoir 14. This is one method of construction for this embodiment that allows for easy cleaning or maintenance of both reservoir 14 and base 6a.

In the slip-on or retrofit design, as shown in FIG. 5, the conveying space is formed around the outer surface of a conventional pepper mill 38. Base 6c includes an inwardly projecting top opening 35 designed to fit tightly around the surface of conventional mill 38. This inwardly projecting ledge of base 6c is penetrated by a plurality of holes 3 and/or pour spout 20. To prevent movement of mill 38 during use, mill opening 35 is fitted with a friction fit retainer or O-ring 33. The retainer 33 rests in an annular semicircular groove 29 cut into mill opening 35.

The conventional mill 38 is firmly seated against a plurality of mill stops or brakes 34 located in the lower portion of conveying space 2c. Mill stops 34 maintain a spacial relationship between conventional mill 38 and base 6c. This prevents sealing of the bottom discharge of the conventional mill 38 when inserted into the slip-on design. Discharge of ground pepper from the mill is achieved in the same manner as described and directed through shaker holes 3 and/or pour spout 20.

The embodiments so described clearly show the utility and ease of operation of this invention. The design solves the problem of distribution of ground product, effectively prevents discharge of product between uses and with no additional moving parts found in current mills.

It will be apparent to anyone skilled in the art the description and drawings represent are intended only to illustrate the invention. Many specificities have been imparted in describing the preferred embodiments of the invention but should not be construed as limitations. Other variations include moving the shaker holes or pour spouts down to the sides of the annular section of the conveying space. Also the conveying space can be constructed to cover only a fraction of the outer surface of the reservoir. A further deviation would be to replace threaded portion 16 with a snap or other fit device. Similarly, separation threads 24 can be replaced by a snap or other connecting device. Another deviation would be to make the support bar 13 removable to allow for complete disassemble of the mill internals. Deviations from the design herein described can be made without departing from the spirit of the invention which is limited only by the following claims;

I claim:

1. A mill for grinding condiment comprising a hollow body reservoir defining a condiment storage well with a grinding stator mounted at one end thereof and a grinding rotor rotatably seated within and in close spacial relation to said grinding stator with a rotational energy transfer device mounted at one end to said grinding rotor and at the other end removably attached to a manipulatable top with a conveying means below said reservoir comprising a base with continuous raised edge and a means for suspending said base, with raised edge facing the reservoir, below said grinding stator whereby all condiment ground or falling from said grinding stator or said grinding rotor is retained upon said base inside the raised edge thereby defining a condiment conveying space.

2. The condiment mill of claim 1 wherein said base extends beyond the perimeter of said reservoir a predetermined distance with elongated raised edges to form a cup shape encompassing the lower portion of said reservoir and where said base is fixedly mounted to said reservoir on a plurality of supports that extend between said reservoir to the inside of said base and where the top has elongated edges to form an inverted cup shape extending down encompassing the upper portion of said reservoir to the end point of the elongated edge of said base and where the mating surface between said top and said base have oppositely raised surfaces to form interlocking rings, thereby increasing the volume of the conveying space, and where said top is removably mounted upon said base and said reservoir, covering said conveying space and said reservoir, and where the mating surfaces between said top and said reservoir have oppositely raised surfaces to form interlocking rings, thereby providing separation of said conveying space and the storage well, and where said top is penetrated above said conveying space by either or both a plurality of holes and a pour spout for dispensing ground condiment.

3. The condiment mill of claim 2 wherein said plurality of supports are fixedly mounted to said base and removable from said reservoir through a plurality of grooves cut or formed in the outer surface of said reservoir and where said grooves are in the shape of an inverted J allowing said supports to slip up into said grooves, then be rotated into position above a locking section and where said rotational energy device has a threaded portion that extends above said top and where said grinding rotor is resiliently urged downward by a tensioning spring fitted between a retaining clamp ridgedly mounted on the inside of said reservoir axially above said grinding stator and said grinding rotor, thereby retaining said tensioning spring in compression against said grinding rotor, where said retaining clamp is constructed with a plurality of support legs extending from said retaining clamp to said reservoir a predetermined length and with a central penetration to allow for free rotation of said rotational energy device where upon an adjusting nut, with internal threads mated to said threaded portion, is screwed, thereby raising said reservoir upward and sliding said supports into said locking section.

4. The condiment mill of claim 3 wherein said rotational energy device is formed as a square shaft ridgedly mounted to said grinding rotor that extends axial to said reservoir up through said tensioning spring then through a shaft bearing rotatably seated in said retaining clamp and terminates with said threaded portion extending through a square hole in said top upward a predetermined distance and where said top is held in place by said adjusting nut threaded onto the threads of said shaft, whereby additional tightening of said adjusting nut induces axial movement in said grinding rotor, and where said shaft bearing is a cylinder penetrated by a square hole and externally formed with an elongated lower half that overlaps the bottom edge of said retaining clamp in the area where the shaft penetrates said retaining clamp thereby separating said tensioning spring from said retaining clamp and with a support bar mounted to said reservoir below said grinding stator.

5. The condiment mill of claim 2 wherein the elongated raised edge of said base forms a cup shape encompassing the cylindrical outer surface of said reservoir a predetermined distance up the sides and where this elongated edge terminates with an inwardly projecting ledge of cylindrical inner projecting surface threaded to mate with opposite threads on the outer surface of said reservoir, this ledge being penetrated above said conveying space with either or both said plurality of holes and said pour spout for dispensing ground condiment, and wherein said top covers said reservoir with oppositely raised edges at the mating surface of said top and said reservoir to form interlocking rings and wherein said top is formed with a plurality of crank handles extending outward from the axis of said reservoir whereon are rotatably fitted crank knobs and where said reservoir is formed with an operable removing means comprising a plurality of tabs extending inward from the surface of said reservoir, and where said supports are fixedly mounted to said base extending upward to friction fit against said reservoir, thereby allowing the use of finger and thumb against said tabs to unscrew said reservoir from said base.

6. The condiment mill of claim 2 wherein the elongated raised edge of said base forms a cup shape encompassing the lower portion and side of said reservoir to define said conveying space and where this elongated edge terminates with an inwardly projecting ledge whose inner projecting surface is shaped to retentively engage the outer surface of said reservoir or existing mill where said supports are fixedly mounted inside said base extending to a predetermined height thereby providing stops during insertion of said reservoir and where this ledge is penetrated with either or both said plurality of holes and said pour spout for dispensing ground condiment.

7. The condiment mill of claim 6 wherein the inner projecting surface of said base is fitted with a friction fit means comprising a groove cut or formed on the inner projecting surface of the ledge, facing said reservoir, wherein is fitted a friction retaining device that encompasses said reservoir or existing mill.

* * * * *